United States Patent
Mantravadi et al.

[11] Patent Number: 5,903,386
[45] Date of Patent: May 11, 1999

[54] TILTED PRIMARY CLAMSHELL LENS LASER SCANNER

[75] Inventors: Murty Venkata Mantravadi, Carson; Dennis Hilliard Rose, Claremont; James Timothy Hall, Torrance; Dennis Carl Richman, Irvine, all of Calif.

[73] Assignee: Northrop Grumman Corporation, Los Angeles, Calif.

[21] Appl. No.: 09/009,321

[22] Filed: Jan. 20, 1998

[51] Int. Cl.$^6$ .................................................. G02B 26/08
[52] U.S. Cl. ...................... 359/366; 359/365; 359/850; 359/853; 359/856; 359/859; 359/867
[58] Field of Search .................... 359/366, 365, 359/850, 853, 856, 859, 867

[56] References Cited

U.S. PATENT DOCUMENTS

| | | | |
|---|---|---|---|
| 2,684,015 | 7/1954 | Grey | 88/57 |
| 3,749,479 | 7/1973 | Kempf | 350/252 |
| 3,836,256 | 9/1974 | Peters | 356/109 |
| 3,951,546 | 4/1976 | Markle | 355/51 |
| 4,205,902 | 6/1980 | Shafer | 350/294 |
| 4,591,268 | 5/1986 | Lew | 356/338 |
| 4,695,139 | 9/1987 | Bagby et al. | 350/620 |
| 4,792,685 | 12/1988 | Yamakawa | 250/353 |
| 4,804,258 | 2/1989 | Kebo | 350/505 |
| 4,861,148 | 8/1989 | Sato et al. | 350/505 |
| 4,863,253 | 9/1989 | Shafer et al. | 350/620 |
| 4,934,805 | 6/1990 | Pinson | 350/620 |
| 5,144,496 | 9/1992 | Kashima | 359/859 |
| 5,144,497 | 9/1992 | Kato et al. | 359/859 |
| 5,257,125 | 10/1993 | Maeda | 359/196 |
| 5,298,736 | 3/1994 | Dreher et al. | 250/216 |
| 5,546,214 | 8/1996 | Black et al. | 359/859 |

*Primary Examiner*—Cassandra Spyrou
*Assistant Examiner*—Mohammad Y. Sikder
*Attorney, Agent, or Firm*—Terry J. Anderson; Karl J. Hoch, Jr.

[57] ABSTRACT

A scanner transmits a generally collimated beam of radiation such that the beam rotates about an axis to form a conical scanning pattern. The scanner comprises a concave parabolic reflector having a geometric axis and a focus, a rotation mechanism for effecting rotation of the concave parabolic reflector about a rotation axis which is angularly offset with respect to the geometric axis of the concave parabolic reflector, an opening formed in the concave parabolic reflector proximate the rotation axis thereof, and a convex parabolic reflector disposed along the rotation axis of the concave parabolic reflector and having a focus which is approximately co-located with the focus of the concave parabolic reflector. Directing collimated radiation through the opening formed in the concave parabolic reflector and onto the convex parabolic reflector while rotating the concave parabolic reflector about the rotation axis thereof effects transmission of a generally collimated beam of radiation such that the beam rotates about the rotation axis so as to form a conical scanning pattern.

9 Claims, 2 Drawing Sheets

TILTED PRIMARY CLAMSHELL LENS LASER SCANNER

FIELD OF THE INVENTION

The present invention relates generally to lidar and more particularly to a tilted primary clamshell lens laser scanner for transmitting a generally collimated beam of radiation such that the beam rotates about a central axis so as to form a conical scanning pattern suitable for lidar applications.

BACKGROUND OF THE INVENTION

Laser infrared radar, commonly referred to as lidar, is well known. In a typical lidar device a ruby laser generates intense infrared pulses having beam widths as small as 30 seconds of arc. Lidar is commonly utilized to measure the density of clouds, smog layers, and other atmospheric discontinuities via the scattering effects afforded thereby. Lidar is also commonly utilized to track airborne objects such as balloons, smoke puffs, rocket trails, etc., via the beam reflections therefrom.

As those skilled in the art will appreciate, the use of lidar is facilitated by various mechanisms which effect scanning of the transmitted light beam. According to contemporary methodology, it is desirable to cause the collimated laser output of the lidar device to scan in a generally circular pattern wherein the beam itself forms a cone about an axis defined along the scanned direction. Thus, as the beam is swept, the conical scanning pattern defines a substantial spatial volume.

However, contemporary mechanisms for effecting such scanning of the output laser beam of a lidar device tend to be undesirably complex in construction and consequently costly to fabricate and maintain. As such, it is desirable to provide a mechanism for effecting conical scanning of the laser output beam of a lidar device which is comparatively simple in construction and which consequently is comparatively inexpensive to fabricate and maintain.

SUMMARY OF THE INVENTION

The present invention specifically addresses and alleviates the above-mentioned deficiencies associated with the prior art. More particularly, the present invention comprises a scanner for transmitting a generally collimated beam of radiation such that the beam rotates about an axis to form a conical scanning pattern. The scanner comprises a concave parabolic reflector having a geometric axis and a focus, a rotation mechanism for effecting rotation of the concave parabolic reflector about a rotation axis thereof which is angularly offset with respect to the geometric axis of the concave parabolic reflector. An opening is formed in the concave parabolic reflector near the rotation axis thereof. A convex parabolic reflector is disposed along the rotation axis of the concave parabolic reflector and has a focus which is approximately co-located with the focus of the concave parabolic reflector.

Directing collimated radiation through the opening formed in the concave parabolic reflector and onto the convex parabolic reflector while rotating the concave parabolic reflector about the rotation axis thereof effects transmission of a generally collimated beam of radiation such that the beam rotates about the rotation axis so as to form a conical scanning pattern.

According to the preferred embodiment of the present invention, the rotation axis is offset with respect to the geometric axis by an angle of between approximately 7° and approximately 10°, preferably approximately 8.5°.

The convex parabolic reflector and the concave parabolic reflector are preferably configured to reflect optical radiation. However, those skilled in the art will appreciate that various different types of radiated energy, e.g., microwave, visible light, infrared, ultraviolet, acoustic, etc., may likewise be utilized.

According to the preferred embodiment of the present invention, the concave parabolic reflector is dynamically balanced so as to better facilitate rotation thereof. As those skilled in the art will appreciate, such dynamic balancing is necessary so as to prevent undesirable wobbling, vibration, or other undesirable movement thereof when the concave parabolic reflector is rotated, particularly at higher speeds.

Further, according to the preferred embodiment of the present invention, a diode laser provides a source of light for the lidar device. The present invention preferably comprises a collimating lens for collimating the output of the diode laser prior to the output beam being incident upon the convex parabolic reflector.

An electrical motor is preferably utilized to effect rotation of the concave parabolic reflector at a desired rate.

The convex parabolic reflector is preferably mounted upon a transparent window which may either be attached to the concave parabolic reflector, and thus rotate along therewith, or being mounted separately therefrom in a stationary fashion. Rotation of the convex parabolic reflector along with a concave parabolic reflector is possible since the geometric axis of the convex parabolic reflector is coincident with the axis of rotation of the concave parabolic reflector.

Thus, according to the present invention, a device for effecting conical scanning of the output of a lidar device which is comparatively simple in construction and which is comparatively inexpensive to fabricate and maintain, is provided.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
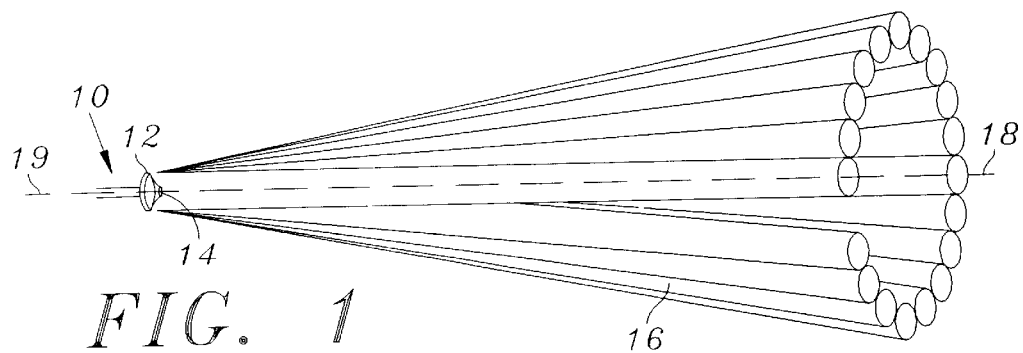
FIG. 1 is a perspective view of the tilted primary clamshell lens laser scanner of the present invention showing the laser output thereof being scanned circularly so as to produce a conical pattern of laser beams.

The tilted primary clamshell lens laser of the present invention is illustrated in FIGS. 1–4, which laser scanner 10 depict a presently preferred embodiment thereof. Referring now to FIG. 1, the tilted primary clamshell lens of the present invention generally comprises a tilted primary clamshell lens or concave parabolic reflector 12 and a secondary lens or convex parabolic reflector 14 (both better shown in FIGS. 2–4).

The output of the tilted primary clamshell lens laser scanner 10 comprises a circularly sweeping or collimated laser output beam 16 which defines a generally conical pattern about rotation axis 18 of the concave parabolic reflector 12. Thus, as those skilled in the art will appreciate, a scanning pattern which is suitable for use in lidar applications is provided.

Figure 2:
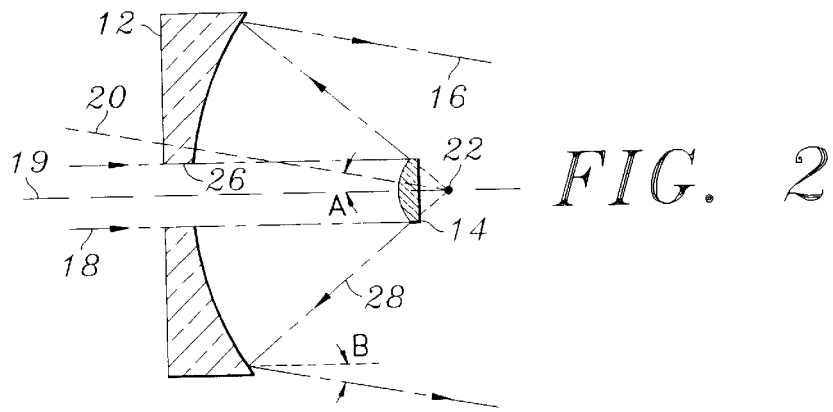
FIG. 2 is a cross-sectional side view of the tilted primary clamshell lens laser scanner of the present invention showing the axis of rotation of the concave parabolic reflector being angularly offset with respect to the geometric axis thereof.

Referring now to FIG. 2, the angular offset of the rotation axis 19 with respect to the geometric axis 20 of the concave parabolic reflector 12 is shown. The angle, Dimension A between the rotation axis 18 and the geometric axis 20 of the concave parabolic reflector 12 is, according to the preferred embodiment of the present invention, between approximately 7° and approximately 10°, preferably approximately 8.5°. Offsetting the geometric axis 20 of the concave parabolic reflector 12 with respect to the rotation axis 18 thereof results through Snell's law of refraction in the collimated laser output beam 16 being directed at an angle, Dimension B, which is preferably approximately 12.5°, with respect to the rotation axis 18.

The geometric axis of the convex parabolic reflector 14 is coincident with the rotation axis 18 of the concave parabolic reflector 12. The focus 22 of the concave parabolic reflector 12 and the focus of the convex parabolic reflector 14 are co-located. Co-location of the focus of the concave parabolic reflector 12 and the convex parabolic reflector 14 results in desired collimation of the expanded output beam 16 of the tilted primary clamshell lens laser scanner 10 of the present invention.

Thus, the collimated laser output beam 19 of a laser diode is directed through opening 26 formed in the concave parabolic reflector 12 such that it is incident upon the convex parabolic reflector 14. The convex parabolic reflector 14 directs the diverging reflected light 28 therefrom to the concave parabolic reflector 12, from which it is reflected in a direction offset with respect to the rotation axis thereof so as to form a generally conical scan pattern as shown in FIG. 1. The laser diode 30 radiates a diverging beam 32 of light which is focused by collimating lens 34 which provides the collimated laser input beam 19 to the convex parabolic reflector 14, as discussed above.

Figure 3:
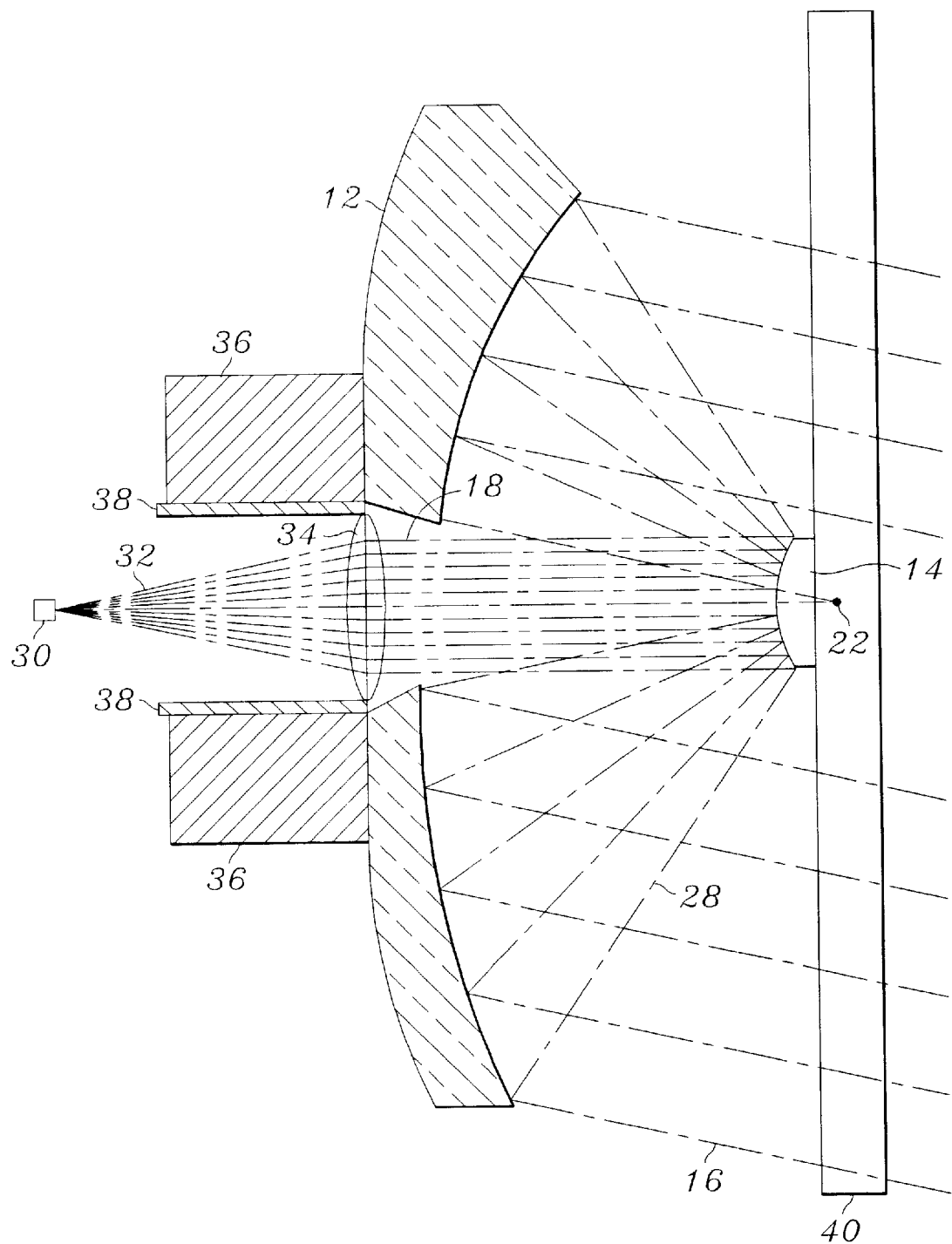
FIG. 3 is a cross-sectional side view of the tilted primary clamshell lens laser scanner of FIG. 2 additionally showing the motor for rotating the concave parabolic reflector, the collimating lens for collimating the output from the diode laser, and the transparent window upon which the convex parabolic reflector is formed.

As shown in FIG. 3, motor 36 effects rotation of the concave parabolic reflector 12 about the rotation axis 18 thereof via bearing 38, so as to effect scanning of the collimated laser output beam 16 as discussed in detail above.

Light transparent window 40 optionally serves as a mount for the convex parabolic reflector 14. Window 40 may optionally be attached to the concave parabolic reflector 12 such that it rotates along therewith and also facilitates proper positioning of the convex parabolic reflector 14.

Figure 4:
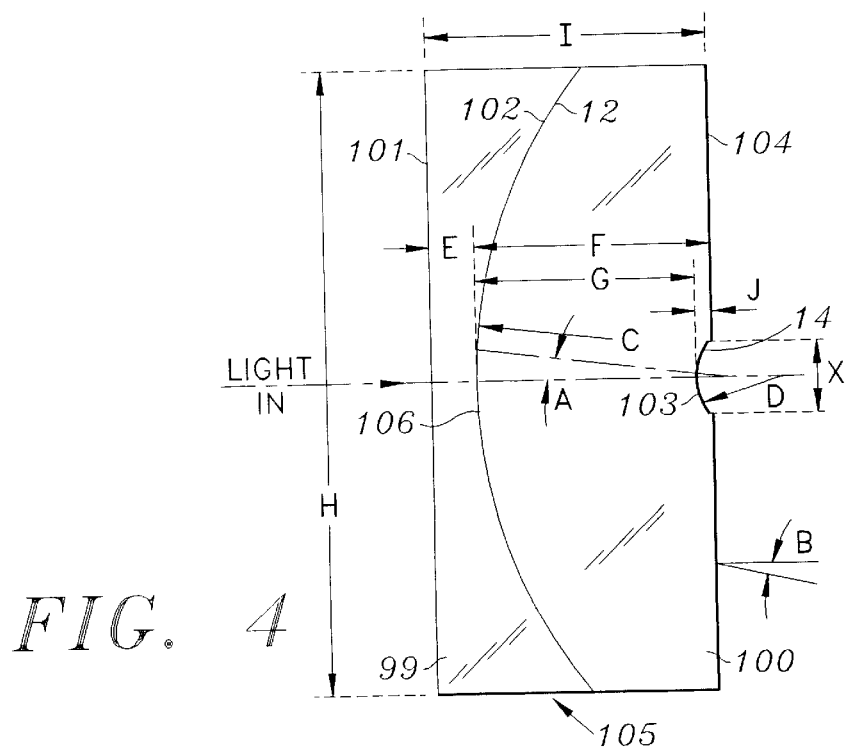
FIG. 4 is a cross-sectional side view of the tilted primary clamshell lens laser scanner of FIGS. 1–3, showing the dimensions and further details of the preferred embodiment thereof.

Referring now to FIG. 4, further details regarding the construction of the tilted primary clamshell lens laser scanner 10 of the present invention are provided.

According to the preferred embodiment of the present invention, the scanner is fabricated by cementing together first 99 and second 100 pieces of transparent acrylic (PMNA) having a refractive index of 1.483. The radius of the concave parabolic reflector 12, Dimension C, is 136.56 mm and the radius of the convex parabolic reflector 14, Dimension D, is 20.0 mm. The rear surface 101 of the first block of acrylic is preferably flat to within one wave p-v/Ca 210.

The parabolic surface 102 of the concave parabolic reflector 12 is preferably coated with enhanced aluminum. The vertex decenter is 9.504 mm and the angle between the geometric axis thereof and the rotation axis 18 is preferably approximately 8.5°. The surface quality of the concave parabolic surface is preferably one-half wave p-v with dig and scratch irregularity preferably limited to two wave p-v. A clear aperture 106 is formed in the aluminum coating so as to allow the collimated light beam from the laser diode to be transmitted therethrough.

The parabolic surface 103 of the convex parabolic reflector 14 is preferably coated with enhanced aluminum and has a surface quality of one-half wave p-v and dig and scratch irregularity of two wave p-v. The exit surface 104 of the second piece of acrylic 100 is preferably configured so as to be flat within one wave p-v/over Ca, 19.50.

The preferred method of fabrication of the first 99 and second 100 pieces of acrylic is via diamond turning.

Dimension E is 12.5 mm. Dimension F is 63.39 mm. Dimension G is 57.63 mm. Dimension I is 17.62 mm. Dimension J is 6.06 mm. Dimension X is 20.30 mm.

These dimensions are specifically for a wavelength of 0.98 $\mu$m.

Referring again to FIG. 3, in operation laser light is generated by laser diode 30 which emits a diverging beam 32 therefrom, which is collimated by collimating lens 34 which directs collimated laser output beam 16 to the convex parabolic reflector 14 which then directs diverging laser beam 28 to the concave parabolic reflector 12. The concave parabolic reflector 12 rotates upon bearing 38, as effected by electric motor 36, so as to cause the collimated laser output beam 16 from the concave parabolic reflector 12 to sweep or scan circularly in a manner which generally defines a cone as shown in FIG. 1.

It is understood that the exemplary tilted primary clamshell lens laser scanner described herein and shown in the drawings represents only a presently preferred embodiment of the invention. Indeed, various modifications and additions may be made to such embodiments without departing from the spirit and scope of the invention. For example, the concave parabolic reflector 12 and the convex parabolic reflector 14 may be comprised of various different materials. Also, various different types of reflective surfaces may be formed thereupon so as to effect desired reflection therefrom. Further, as those skilled in the art will appreciate, various different types of radiated energy may be utilized according to the present invention. For example, microwaves, acoustic energy, visible light, infrared, ultraviolet, etc. may be utilized.

Thus, these and other modifications and additions may be obvious to those skilled in the art and may be implemented to adapt the present invention for use in a variety of different applications.

What is claimed is:

1. A scanner for transmitting a generally collimated beam of radiation such that the beam rotates about an axis to form a conical scanning pattern, the scanner comprising:

a) a concave parabolic reflector having a geometric axis and a focus;

b) a rotation mechanism for effecting rotation of the concave parabolic reflector about a rotation axis which is angularly offset with respect to the geometric axis of the concave parabolic reflector;

c) an opening formed in the concave parabolic reflector near the rotation axis thereof;

d) a convex parabolic reflector disposed along the rotation axis of the concave parabolic reflector and having a focus which is approximately co-located with the focus of the concave parabolic reflector; and e) a collimating lens disposed at the opening formed in the concave parabolic reflector directing collimated radiation through the opening formed in the concave parabolic reflector and onto the convex parabolic reflector while rotating the concave parabolic reflector about the rotation axis thereof effects transmission of a generally collimated beam of radiation such that the beam rotates about the rotation axis so as to form a conical scanning pattern.

2. The scanner as recited in claim 1, wherein the rotation axis is offset with respect to the geometric axis by an angle of between approximately 7 degrees and approximately 10 degrees.

3. The scanner as recited in claim 1, wherein the rotation axis is offset with respect to the geometric axis by an angle of approximately 8.5 degrees.

4. The scanner as recited in claim 1, wherein the convex parabolic reflector and the concave parabolic reflector are configured to reflect optical radiation.

5. The scanner as recited in claim 1, wherein the concave parabolic reflector comprises a dynamically balanced concave parabolic reflector so as to facilitate rotation thereof.

6. The scanner as recited in claim 1, further comprising a collimating lens for collimating an output from a diode laser prior to the output being incident upon the convex parabolic reflector.

7. The scanner as recited in claim 1, further comprising a motor in mechanical communication with the concave parabolic reflector for effecting rotation thereof.

8. The scanner as recited in claim 1, further comprising a transparent window upon which the convex parabolic reflector is mounted.

9. A lidar system having a scanner for transmitting a generally collimated beam of radiation such that the beam rotates about an axis to form a conical scanning pattern, the scanner comprising:

a) a concave parabolic reflector having a geometric axis and a focus;

b) a rotation mechanism for effecting rotation of the concave parabolic reflector about a rotation axis which is angularly offset with respect to the geometric axis of the concave parabolic reflector;

c) an opening formed in the concave parabolic reflector near the rotation axis thereof;

d) a convex parabolic reflector disposed along the rotation axis of the concave parabolic reflector and having a focus which is approximately co-located with the focus of the concave parabolic reflector; and e) a collimating lens disposed at the opening formed in the concave parabolic reflector directing collimated radiation through the opening formed in the concave parabolic reflector and onto the convex parabolic reflector while rotating the concave parabolic reflector about the rotation axis thereof effects transmission of a generally collimated beam of radiation such that the beam rotates about the rotation axis so as to form a conical scanning pattern.

* * * * *